(12) United States Patent
McCutchen

(10) Patent No.: US 11,014,024 B2
(45) Date of Patent: May 25, 2021

(54) WATER SKIMMING DEVICE AND METHOD

(71) Applicant: SW Feesaver, LLC, Greenville, SC (US)

(72) Inventor: James McCutchen, Greer, SC (US)

(73) Assignee: SW Feesaver, LLC, Greenville, SC (US)

( * ) Notice: Subject to any disclaimer, the term of this patent is extended or adjusted under 35 U.S.C. 154(b) by 0 days.

(21) Appl. No.: 16/412,501

(22) Filed: May 15, 2019

(65) Prior Publication Data

US 2019/0270037 A1 Sep. 5, 2019

Related U.S. Application Data

(63) Continuation of application No. 14/888,502, filed as application No. PCT/US2014/038453 on May 16, 2014, now Pat. No. 10,335,715.

(Continued)

(51) Int. Cl.
 *B01D 21/34* (2006.01)
 *B01D 21/30* (2006.01)
 (Continued)

(52) U.S. Cl.
 CPC ....... *B01D 21/307* (2013.01); *B01D 21/0003* (2013.01); *B01D 21/2444* (2013.01); *B01D 21/34* (2013.01)

(58) Field of Classification Search
 CPC .................................................. B01D 21/307
 See application file for complete search history.

(56) References Cited

U.S. PATENT DOCUMENTS 5,290,434 A 3/1994 Richard
5,549,817 A 8/1996 Horsley et al.
(Continued)

FOREIGN PATENT DOCUMENTS

CA 2096341 8/1992
KR 10-20040042229 5/2004
(Continued)

OTHER PUBLICATIONS

Search Report for International Application No. PCT/US2014/038453, dated Sep. 26, 2014.
(Continued)

*Primary Examiner* — Peter Keyworth
(74) *Attorney, Agent, or Firm* — JK Intellectual Property Law, PA

(57) ABSTRACT

A skimmer for removing water from a sediment basin to a water removal system may include a float portion, and a first pipe having a first end attached to said float portion and in communication with the water removal system. The first pipe has an orifice formed therein to admit water from below a surface of said sediment basin. A guard is attached to said float portion and said first pipe, said guard fixedly positioning said float portion so that said orifice is located below said surface. The guard has a continuous, vertically-extending side wall having a bottom edge defining a water flow path opening located below said orifice. A flow path into said orifice from the sediment basin extends only through said flow path opening, upwardly to said orifice, then downwardly though said orifice into said first pipe.

7 Claims, 3 Drawing Sheets

Related U.S. Application Data

(60) Provisional application No. 61/824,578, filed on May 17, 2013.

(51) Int. Cl.
 *B01D 21/24* (2006.01)
 *B01D 21/00* (2006.01)

(56) References Cited

U.S. PATENT DOCUMENTS

| | | | |
|---|---|---|---|
| 5,618,410 | A | 4/1997 | Wallace et al. |
| 5,820,751 | A | 10/1998 | Faircloth, Jr. |
| 8,043,026 | B2 * | 10/2011 | Moody ............... E03F 5/107 |
| | | | 137/578 |
| 9,574,337 | B1 | 2/2017 | Lang et al. |
| 2007/0251879 | A1 | 11/2007 | Batten et al. |

FOREIGN PATENT DOCUMENTS

| | | |
|---|---|---|
| KR | 10-20090034526 | 4/2009 |
| KR | 10-20100082431 | 7/2010 |

OTHER PUBLICATIONS

Canadian Office Action for Application No. 2,949,117, dated Jul. 23, 2020.

* cited by examiner

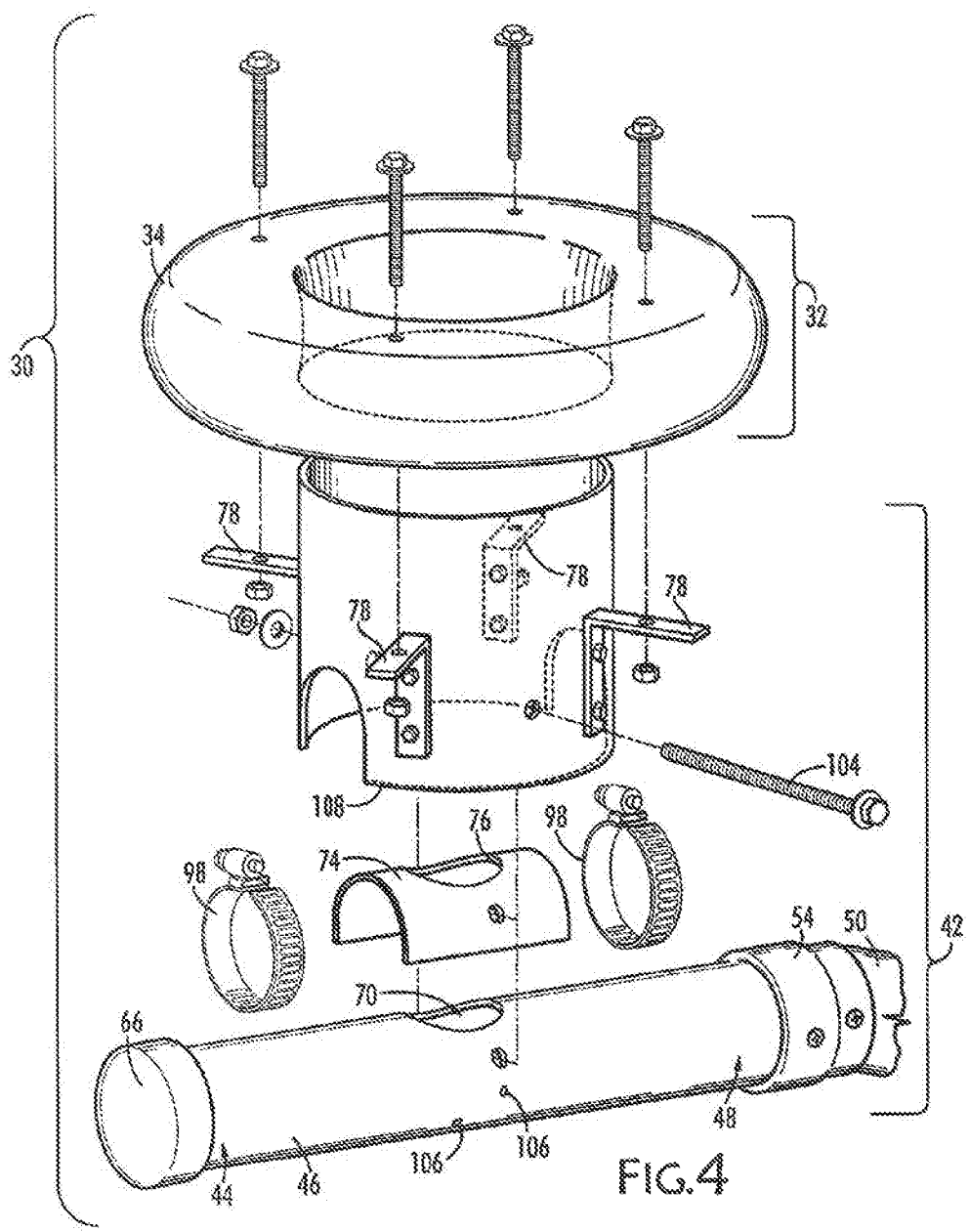

WATER SKIMMING DEVICE AND METHOD

CROSS-REFERENCE TO RELATED APPLICATIONS

The present application is a continuation of co-pending U.S. patent application Ser. No. 14/888,502, filed Nov. 2, 2015 which is a National Phase of PCT International Application No. PCT/US2014/038453, filed May 16, 2014, which in turn claims priority to U.S. Provisional Patent Application Ser. No. 61/824,578, filed May 17, 2013, all of which are incorporated herein by reference in their entirety.

BACKGROUND

The present invention relates generally to water skimmers used to control the removal of water from sediment basins.

Water flow rate control skimmers are used in storm water and erosion control applications to control the release of water from ponds and sediment basins. They release water to an adjacent area at controlled rates from just below a sediment basin's water surface where the water has the least sediment, leaving the settled sediment to accumulate in the bottom of the basin.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

The present invention is a skimmer for releasing water from a sediment basin to a water removal system and a method for installing the skimmer. The skimmer includes a float portion operatively connected to a drain portion. The apparatus may include one or more floats for maintaining the drain portion near the surface of the water in the sediment basin. The float portion must have the right balance of water displacement (its flotation aspect) and weight to maintain the drain portion at the proper depth. For simplicity, the float portion will be referred to herein as the float portion notwithstanding its position relative to the surface of the water. The drain portion includes a first pipe connected to the float portion and a second pipe that drains into the water removal system. The second pipe is connected using a flexible coupling at each end, coupling to the first pipe and one to the stub out of the water removal system so that the first pipe can rise and fall with the water level and the second pipe remains connected to it and the water removal system despite changes in its orientation as it follows the vertical movements of the first pipe. The first pipe is attached to the float member so as to be held horizontally just below the surface of the water. The first pipe has an orifice to receive the basin water and a guard around the orifice to exclude debris. The orifice size can be modified with an orifice saddle and clamps.

To facilitate a constant or near constant flow rate of relatively sediment-free water, the drain head is supported by the float at a level just below the water surface and limits the instantaneous volume of water that enters the drain to obtain the desired flow rate.

The orientation of the float portion with respect to the first pipe, and the flexible couplings of the second pipe help maintain water flow rate control because both cooperate to hold first pipe in a horizontal orientation just below the water surface so a constant volume of water is able to flow into orifice.

The present invention also includes a method for installing a skimmer in a sediment basin. The method may including the following steps: 1) providing a skimmer having a float portion and a drain portion; 2) preparing the sediment basin below the skimmer; 3) providing a stub out for the collected water to drain into the water removal system; and 4) connecting the skimmer to the stub out. Float portion includes at least one float that will support the drain portion at the required depth below the surface. The drain portion includes: a first pipe with an orifice, a second pipe, two flexible couplings, a stub out to allow connection of the second pipe to the water removal system, a guard to exclude debris from flowing into the drain portion, an orifice saddle to modify the size of the orifice on the first pipe, two clamps to hold the orifice saddle to the first pipe, and several brackets and bolts to connect the first pipe to the guard and the guard to the float portion.

According to other aspects of the disclosure, a skimmer for removing water from a sediment basin to a water removal system may include a float portion, and a first pipe having a first end attached to said float portion and in communication with the water removal system for removing water from the sediment basin. The first pipe has an orifice formed therein to admit water from below a surface of said sediment basin. A guard is attached to said float portion and said first pipe, said guard fixedly positioning said float portion with respect to said first pipe and said orifice so that said orifice of said first pipe is located below said surface. The guard has a continuous, vertically-extending side wall having a bottom edge defining a water flow path opening located below said orifice. The guard and said float portion surrounding said orifice upwardly from said bottom edge to thereby define a flow path into said orifice from the sediment basin to be only through said flow path opening, upwardly to said orifice, then downwardly though said orifice into said first pipe.

Other features and their advantages will be readily apparent to those skilled in the arts, techniques and equipment relevant to the present invention from a careful reading of the Detailed Description of Preferred Embodiments, accompanied by the following drawings.

BRIEF DESCRIPTION OF DRAWINGS

FIG. 4 is an exploded, perspective view of a water skimmer with one float, according to an embodiment of the present invention.

DETAILED DESCRIPTION OF PREFERRED EMBODIMENT

The present invention includes methods and apparatuses relating to water skimmers for use in removing water from a sediment basin, wastewater lagoon or pond. Sediment basins, which term will be used to refer to ponds and any small body of water, man-made or otherwise, engineered or natural, that receives runoff from its immediate surroundings, are used to prevent sediment produced by heavy rainfall from adversely affecting the vicinity. These may also include wastewater lagoons. Sediment basins are used in connection with a water removal system which is any structure or land configuration that receives water from the sediment basin and redistributes it to that water removal system, preferably leaving sediment behind.

Figure 1:
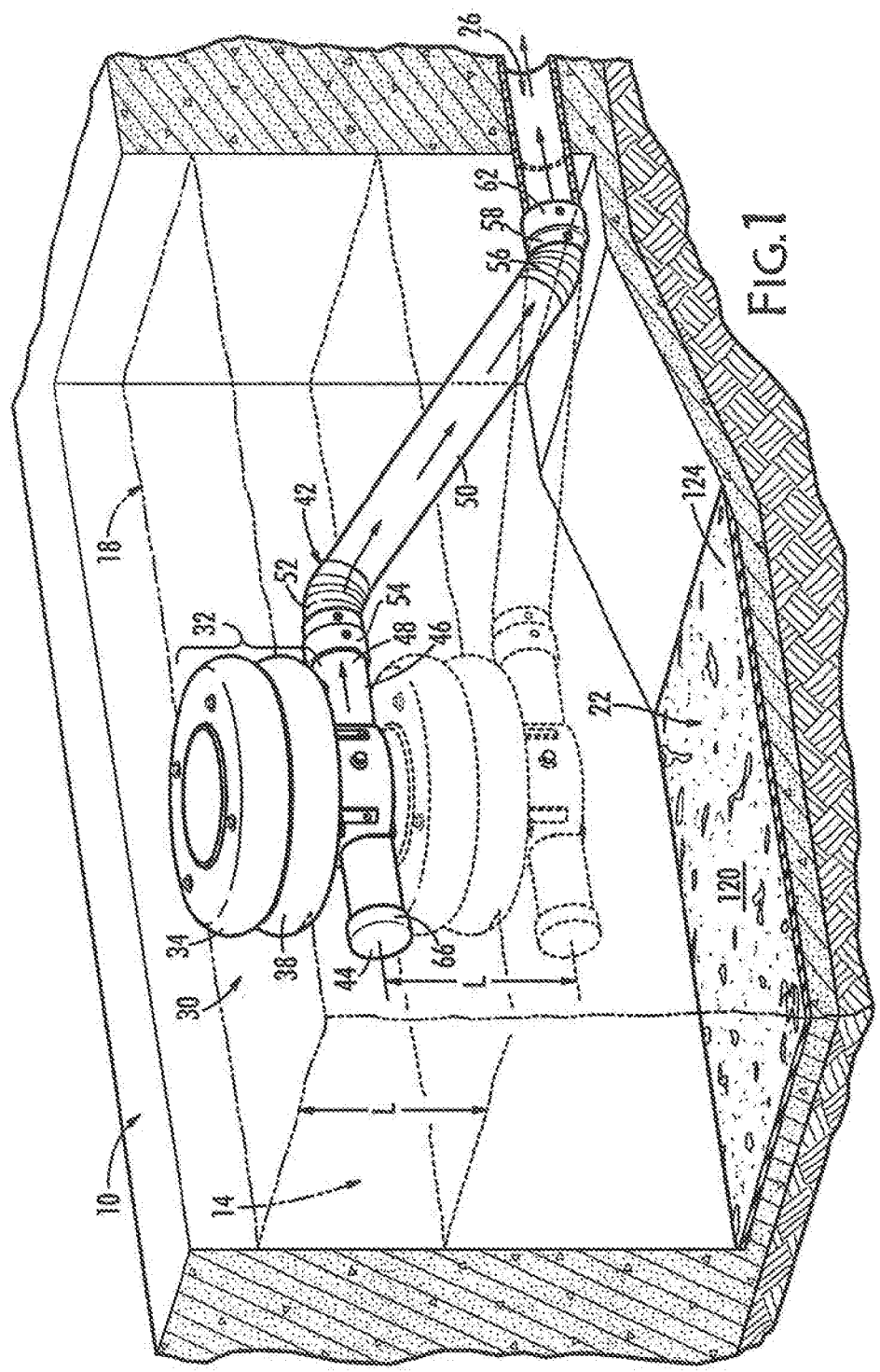
FIG. 1 is a perspective view of a water skimmer in a sediment basin, according to an embodiment of the present invention.

Referring now to the FIG. 1, there is shown a portion of sediment basin 10 containing water 14. The water has a surface 18 a distance from the bottom 22 of basin 10. Sediment in that water will tend to settle out, that is, to slowly fall to bottom 22, leaving water 14 near surface 18 relatively cleaner than that at bottom 22. Accordingly, water 14 that is transferred to a water removal system through an outlet 26 will be relatively clearer if taken from just below surface 18 than closer to bottom 22.

A skimmer, generally indicated by reference number 30 includes a float portion 32 which, as shown in FIG. 1, includes an upper float 34 and lower float 38. The choice of one, two, or more floats is a question of the weight to be supported by float portion 32 needed to counteract the buoyancy of the second pipe 50, which may require a modest amount of experimentation and calculation within the level of ordinary skill of a professional engineer. Float portion 32 may be made of polyethylene or high density polyethylene. FIG. 1 also shows skimmer 30 floating both on a nominal water surface 18 and, on a lower water surface 18 in phantom lines to illustrate where skimmer 30 would be if the amount of water 14 were reduced so that water surface decreased by a distance L. Skimmer 30 would also be lower by the same distance L.

Upper and lower floats 34, 38, support a drain portion 42 that includes a first pipe 46 and a second pipe 50. First pipe 46 has a first end 44 and a second, opposing end 48. Second pipe has a first end 52 and an opposing second end 56. Second end 48 of first pipe 46 is attached to first end 52 of second pipe 50 using an upper flexible coupling 54. Second end 56 of second pipe 50 is attached to a lower flexible coupling 58 where it may be attached to a stub out 62 on the end of outlet 26 to a water removal system (not shown). First end 44 of first pipe 46 may be terminated in a cap 66 which may be integral or a separate part that is attached to first end 44.

First pipe 46 is attached to float portion 32 so that first pipe 46 remains generally parallel to surface 18 and orifice 70 is on the top of first pipe 46. Water taken from just below surface 18 flows under bottom edge of guard 108 and into orifice 70, into first pipe 46 and then through second pipe 50 and ultimately through the outlet 26 to water removal system regardless of the elevation of surface 18 of water in sediment basin 10.

Float portion 32, first pipe 46 and second pipe 50 may be made of high density polyethylene (HDPE), which is durable, tough and highly UV resistant, or, for temporary applications, of polyvinylchloride. Second pipe 50, because it will pivot from approximately horizontal when first installed to a more vertical orientation needs to be longer than water 14 is deep, such as 50% longer than the depth of water 14 in sediment basin 10.

Figure 2:
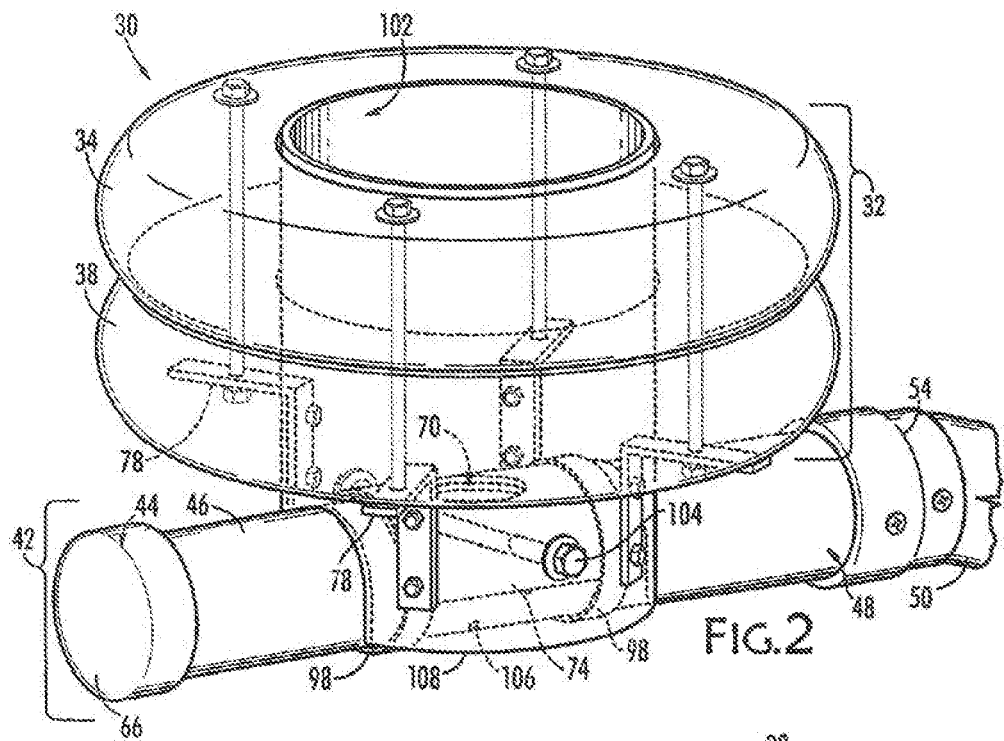
FIG. 2 is a perspective view of a water skimmer with two floats showing portions of the structure of the skimmer using phantom lines, according to an embodiment of the present invention.
Figure 3:
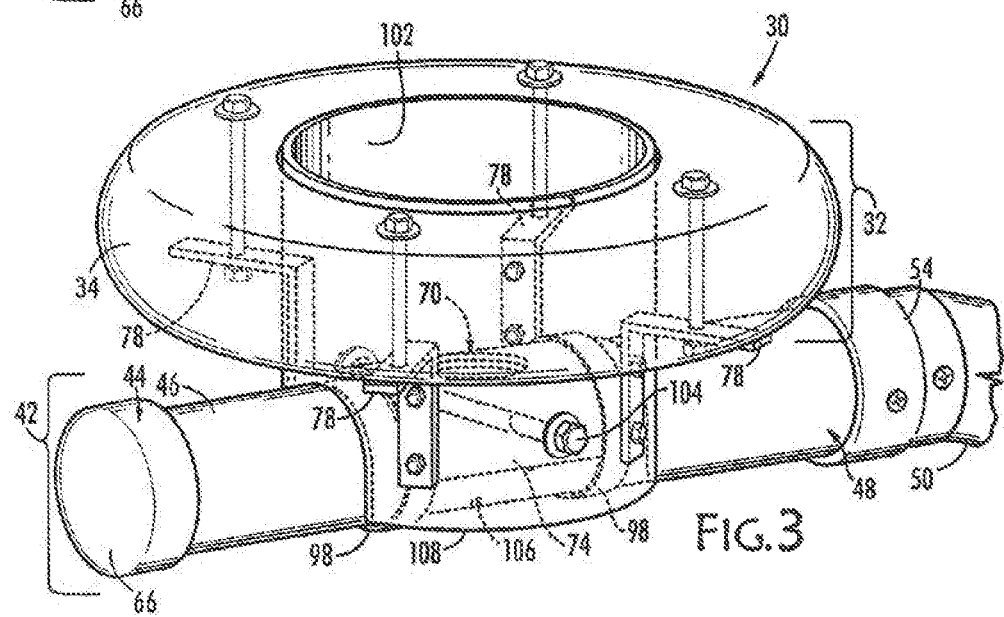
FIG. 3 is a perspective view of a water skimmer with one float showing portions of the structure of the skimmer using phantom lines, according to an embodiment of the present invention.

Referring now to FIGS. 2-4, first pipe 46 has an orifice 70 (best seen in FIG. 4) formed therein and held by float portion 32 so that orifice 70 is just below water surface 18 of sediment basin 10 so that it will admit water 14 from just below the surface 18. Water 14 taken just below surface 18 has relatively less sediment than water near bottom 22 and, by being below surface 18, orifice may receive as much water as its size will allow, subject to the head of water 14 which is controlled by height of float 32 relative to orifice 70.

An orifice saddle 74 is attached to first pipe 46. Orifice saddle 74 has a hole 76 formed in it that can be placed in registration with orifice 70. Orifice saddle 74 may be selected to restrict flow into first pipe 46 and may exclude debris. Clamps 98 are used to hold orifice saddle 74 to first pipe 46 and to permit removal and replacement of orifice saddle 74 to alter the amount of water entering first pipe 46

Skimmer 30 includes a guard 102 that defines the entrance to drain portion 42. Guard 102, secured to first pipe 46 by a bolt 104 (but could alternatively be fused to drain portion and not require bolt), receives the inflow of water 14 in the vicinity of skimmer 30 from below its bottom edge 108 when it flows into orifice 70. Guard 102 thereby prevents most floating debris from entering orifice 70. Guard 102 also holds float portion 32 by providing a surface for attaching brackets 78 to position upper float 34 and lower float 38 with respect to first pipe 46. First pipe 46 is to be positioned below water surface 18, and may be several centimeters below water surface 18, such as 10 cm (4 inches).

Brackets 78 may conveniently be L-shaped to permit being bolted to guard 102 and float portion 32 using bolts 100 that extend through float portion 32 regardless of whether there is only upper float 43 or also a lower float 38. Brackets 78 hold float portion 32 a fixed distance from first pipe 46, they can also assure first pipe 46 is below surface 18 as float portion 32 will rest sets into water to some extent, partially below the surface of water and partly above.

Guard 102, its bolt 104, orifice saddle 74 and its clamps 98, may also assure that drain portion 42 is positioned between first end 44 and second end 48 of first pipe 46 so that first pipe 46 is approximately level, a little more or a little less, which helps to keep orifice 70 generally level with respect to the water surface 18. Guard 102 may be made of polyethylene or high density polyethylene, bolt 86 is made of stainless steel, and brackets are made of aluminum.

First pipe 46 includes at least one weep hole 106 formed therein to allow air inside it to escape and water 14 to enter slowly. This allows water 14 to further drain when water surface 18 is below elevation of orifice 70

The present invention is also a method for installing skimmer 30.

To install skimmer 30 according to the present invention, a user first provides a sediment basin 10 near a water removal system and forms a depression 120 in a portion of the bottom of sediment basin (see FIG. 1). Depression 120 is preferably approximately 30 cm (12 inches) below the balance of bottom 22 of sediment basin 10 Next riprap 124 is placed in the depression so that, when skimmer 30 is placed on riprap 124, first pipe 46 is about 20 cm (8 inches) below bottom 22. The next step is to attach skimmer 30 to water removal system 26 by first attaching lower flexible coupling 58 to water removal system through a stub out 62. Now lower flexible coupling 58 is connected to opposing end 56 of second pipe 50. First end 52 of second pipe 50 is connected to upper flexible coupling 54. Now, upper flexible coupling 54 is connected to second end 48 of first pipe 46. First pipe 46 is connected to float portion 32 so that when float portion 42 is floating on water surface 18, orifice 70 of first pipe 46 is below water surface 18.

As sediment basin 10 fills with water 14, float portion 32 and first pipe 46 will rise with water 14 riding on water surface 18, and second pipe 50 will pivot with respect to first pipe 46 following its movement.

Preferably, float portion 32 is connected to first pipe 46 so that float portion 32 keeps first pipe 46 more or less level. Also, first pipe 46 may be held by float portion 32 just below water surface 18, by about 10 cm (4 inches), for example.

Those skilled in the relevant arts will appreciate from the foregoing description of preferred embodiments that substitutions and modification can be made without departing from the spirit and scope of the invention which is defined by the appended claims.

I claim:

1. A skimmer for floating on a surface of and removing water from a sediment basin to a water removal system, said skimmer comprising:
    a float portion;
    a first pipe attached to said float portion and in communication with the water removal system for removing water from the sediment basin, said first pipe having an orifice formed therein to admit water from below said surface of water in said sediment basin; and
    a guard attached to said float portion and said first pipe so as to float together with said float portion and said first pipe on said surface of water in said sediment basin in a floating orientation, said guard fixedly positioning said float portion with respect to said first pipe and said orifice in said floating orientation so that a combined net buoyancy of said float portion, said first pipe, and said guard causes said orifice of said first pipe to be located a first predetermined distance below said surface, said guard having a continuous, vertically-extending side wall having a bottom edge defining a water flow path opening, said bottom edge defining two upwardly-extending cavities sized to receive and locate said first pipe so that said orifice is located at said first predetermined distance, said combined net buoyancy causing said flow path opening to be located a second predetermined distance below said orifice in said floating orientation, said guard and said float portion surrounding said orifice upwardly from said bottom edge to thereby define a flow path into said orifice from the sediment basin to be only through said flow path opening, upwardly to said orifice, then downwardly though said orifice into said first pipe in said floating orientation;
    said float portion, said first pipe, and said guard when in said floating orientation defining a vertical axis extending through said float portion, said first pipe, and said guard, said first pipe when in said floating orientation defining central axis extending longitudinally from a first end of said first pipe to a second end of said first pipe with said orifice being between said first end and said second end, and wherein when in said floating orientation said central axis being fixedly oriented relative to said float and said guard horizontally and perpendicular to the vertical axis.

2. The skimmer of claim 1, further comprising:
    an orifice saddle carried on said first pipe, said orifice saddle having a hole formed therein in registration with said orifice; and
    said orifice saddle being over said orifice in said first pipe so that said water flows through said hole in said orifice saddle, through said orifice, and into said first pipe.

3. The skimmer of claim 2, wherein said orifice saddle is removable from the first pipe.

4. The skimmer of claim 1, wherein said first pipe includes at least one weep hole formed therein.

5. The skimmer of claim 1, wherein said float portion includes an upper float and a lower float.

6. The skimmer of claim 1, further including a second pipe having a first end and a second end, an upper flexible coupling connecting said first end of said second pipe and a second end of said first pipe, and a lower flexible coupling connected to said second end of said second pipe and attachable to said water removal system.

7. The skimmer of claim 1, wherein as an elevation of said surface of said water in said sediment basis changes, said first pipe is attached to said float portion so that said orifice of said first pipe remains below said surface by said first predetermined distance regardless of the elevation, and so that said central axis remains in a horizontal orientation.

* * * * *